United States Patent [19]
Khariton

[11] Patent Number: 6,086,479
[45] Date of Patent: Jul. 11, 2000

[54] ALIGNMENT DEVICE

[75] Inventor: Yefim Khariton, Brooklyn, N.Y.

[73] Assignee: Bayside Controls, Inc., Port Washington, N.Y.

[21] Appl. No.: 09/016,516

[22] Filed: Jan. 30, 1998

[51] Int. Cl.[7] .................................................. F16C 3/00
[52] U.S. Cl. ................................................. 464/179
[58] Field of Search ............................... 464/179, 180, 464/182, 185, 901; 411/432, 393, 537, 533

[56] References Cited

U.S. PATENT DOCUMENTS

| | | | |
|---|---|---|---|
| 1,978,689 | 10/1934 | Peters ....................................... | 464/179 |
| 4,295,276 | 10/1981 | Ellington, III . | |
| 4,327,496 | 5/1982 | Rebman . | |
| 4,717,299 | 1/1988 | Underwood .............................. | 411/533 |
| 5,249,362 | 10/1993 | Harding ................................... | 411/393 |
| 5,454,675 | 10/1995 | DeHaitre ................................. | 411/432 |
| 5,597,279 | 1/1997 | Thomas et al. ......................... | 411/432 |
| 5,632,684 | 5/1997 | Kumar et al. ............................ | 464/179 |

FOREIGN PATENT DOCUMENTS

| | | | |
|---|---|---|---|
| 876408 | 11/1942 | France .................................... | 411/432 |
| 2-51606 | 2/1990 | Japan ...................................... | 411/432 |
| 2238592 | 6/1991 | United Kingdom ................... | 411/432 |

*Primary Examiner*—Lynne H. Browne
*Assistant Examiner*—Greg Binda
*Attorney, Agent, or Firm*—Collard & Roe, P.C.

[57] ABSTRACT

A device for aligning a motor shaft coupled to an input shaft supported by a bearing in a driven device, comprising a nut adapted for mounting on the driven device and a washer adapted for mounting on the bearing. The nut has an inner edge, an outer edge and a bottom surface having a concave spherical curvature. The washer has an upper surface with a convex spherical curvature corresponding to the concave spherical curvature of the nut. The spherical curvature of the washer has sufficient clearance for sliding against the spherical curvature of the nut. When the nut is mounted to the driven device and the washer is mounted to the bearing, the spherical surfaces of the nut and washer mate. The spherical surface of the washer can slide against the spherical surface of the nut to compensate for angular stresses on the shaft and maintain precise alignment of the motor shaft at all times. The invention also comprises a gearbox having the alignment device mounted therein.

6 Claims, 4 Drawing Sheets

ALIGNMENT DEVICE

BACKGROUND OF THE INVENTION

1. Field of the Invention

This invention relates to a device for precisely aligning a motor shaft with another device such as a gearbox assembly. In particular, the invention relates to a metal nut that surrounds the motor shaft and cooperates with an opposing ring to precisely align the motor shaft with a pinion gear or other device.

2. The Prior Art

In motor-driven devices, precise alignment of the motor shaft with the driven device is absolutely necessary to ensure efficient operation and durability of the device. Even a slight misalignment of the motor shaft can lead to excessive wear on portions of the device, as well as inefficient operation and undesirable vibrations. This is particularly true if the device is operating for sustained periods of time.

Achieving precise alignment of mating parts in machinery is of great concern to manufacturers. Aligning the parts can be very time consuming and often cannot be accomplished by automated means such as robotics.

The problem of misalignment of machinery parts span all types of industries. Methods of aligning cooperating elements have been introduced in machines from tape recorders to electric mixers and food processors, to automobile engines and many other types of devices.

U.S. Pat. No. 4,327,496 to Rebman discloses a device for accommodating misalignment between mating parts that utilizes a series of link elements disposed along the longitudinal axis of the device.

Another device for aligning a motor shaft is disclosed in U.S. Pat. No. 4,295,276 to Ellington III. This device comprises a disc having an annular flange and an annular mounting hub on one side of the flange. The hub is slipped into a bore on a gear assembly into which a motor shaft is to be mounted. The disc has a piloting slot and a directional arrow arranged thereon to correctly position the motor shaft. This device both aligns and mounts the shaft into the gear assembly.

While these devices are adequate for their intended purpose, it is desirable to use an alignment device that precisely aligns a motor shaft and that is independent of the method of mounting the shaft into the driven device.

SUMMARY OF THE INVENTION

It is therefore an object of the present invention to provide a device for precisely aligning a motor shaft that compensates for lateral and angular movement of the input shaft and parts during operation.

It is another object of the present invention to provide a device for aligning a motor shaft that is simple to manufacture and install.

These and other objects of the invention are accomplished by device for aligning a motor shaft coupled to an input shaft in a device such as a gearbox, comprising a nut adapted for mounting on the gearbox and a washer adapted for mounting on a bearing supporting the input shaft. The nut has an inner edge, an outer edge and a bottom surface having a concave spherical curvature. The washer has an upper surface with a convex spherical curvature corresponding to the concave spherical curvature of the nut. The upper surface of the washer may have a width slightly smaller than the width of the bottom surface of the nut.

When the nut is mounted to the driven device and the washer is mounted to the bearing, the spherical surfaces of the nut and washer mate. The spherical surface of the washer can slide against the spherical surface of the nut to compensate for angular stresses on the shaft and maintain precise alignment of the motor shaft at all times.

The nut has a flat top surface. The bottom surface has a downwardly-extending annular ridge in a central section of the bottom surface and a flat inner portion extending from the annular ridge to the inner edge of the nut. The concave spherical curvature extends from the outer edge of the nut to the annular ridge. The annular ridge and flat inner portion of the nut define a cavity for receiving a seal surrounding the input shaft.

The nut has external threads for coupling the nut to the gearbox by screwing it onto a threaded portion of the gearbox. A screw connection ensures stability of the nut within the gearbox. However, other methods of securing the nut to the gearbox could also be used.

There is at least one aperture in the bottom surface of the nut, and at least one slot in the top surface of the washer. A pin positioned in the aperture of the nut fits through the slot in the washer and prevents rotation of the bearing on which the washer is mounted. The washer is preferably mounted onto the bearing in such a way that the washer does not rotate or otherwise move with respect to the bearing.

The washer has a cylindrical side wall and a bottom surface having a width smaller than the width of the top surface. This configuration provides a lip for mounting the washer on the bearing.

Preferably, the spherical curvatures of the nut and washer have radii that meet at a point along the rotational axis of the input shaft. This point defines an axis about which the input and motor shafts move when the shafts are initially aligned in the gearbox. This point is preferably located at the end of the input shaft, beyond any gearing mechanism, such as a sun gear located on the input shaft.

The spherical surfaces of the alignment device can slide against one another to compensate for axial stresses applied to the input shaft and thus to the motor shaft until a precise alignment of the motor shaft within the gearbox is attained. The spherical surfaces of the nut and washer are formed in such a way that there is sufficient clearance for the washer to slide along the nut during alignment.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
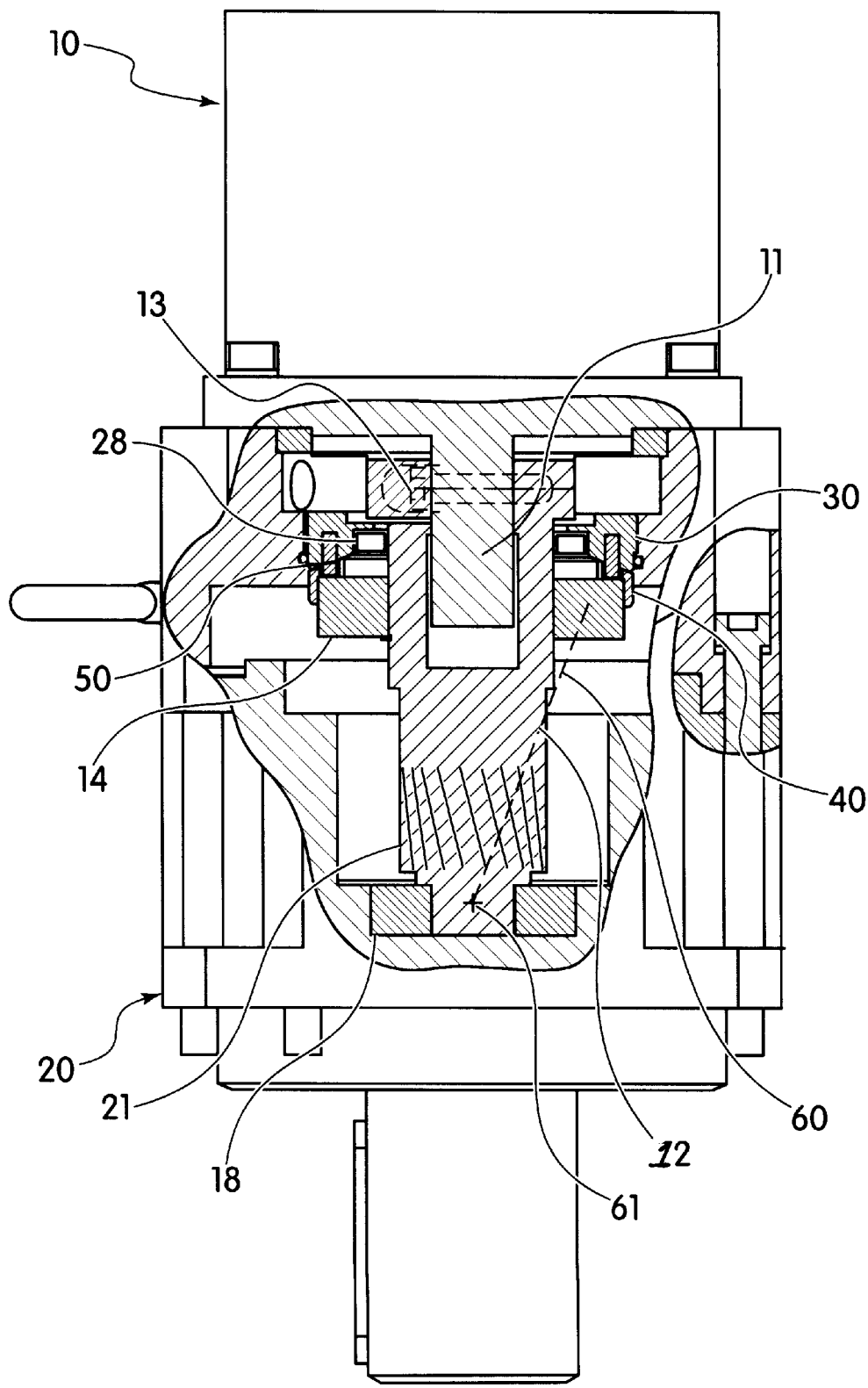
FIG. 1 shows a cross-sectional view of a motor shaft inserted into an input shaft in a gearbox assembly having the device according to the present invention.

Referring now in detail to the drawings and, in particular, FIG. 1, there is shown a motor 10 having a motor shaft 11 coupled to an input shaft 12 that is mounted on bearings 14 and 18 within a gearbox assembly 20. A sun gear 21 is positioned around the input shaft and is driven by motor shaft 11. Motor shaft 11 is coupled to input shaft 12 by a screw assembly 13.

Precise alignment of the motor and input shaft within the gearbox is often difficult to achieve. The device according to the invention accomplishes precise alignment by allowing for axial movement of the shaft during the alignment process. The device comprises a nut 30 mounted to gearbox assembly 20 and a washer 40 mounted on bearing 14, which are shown in enlarged cross-sectional view in FIG. 2.

Figure 2:
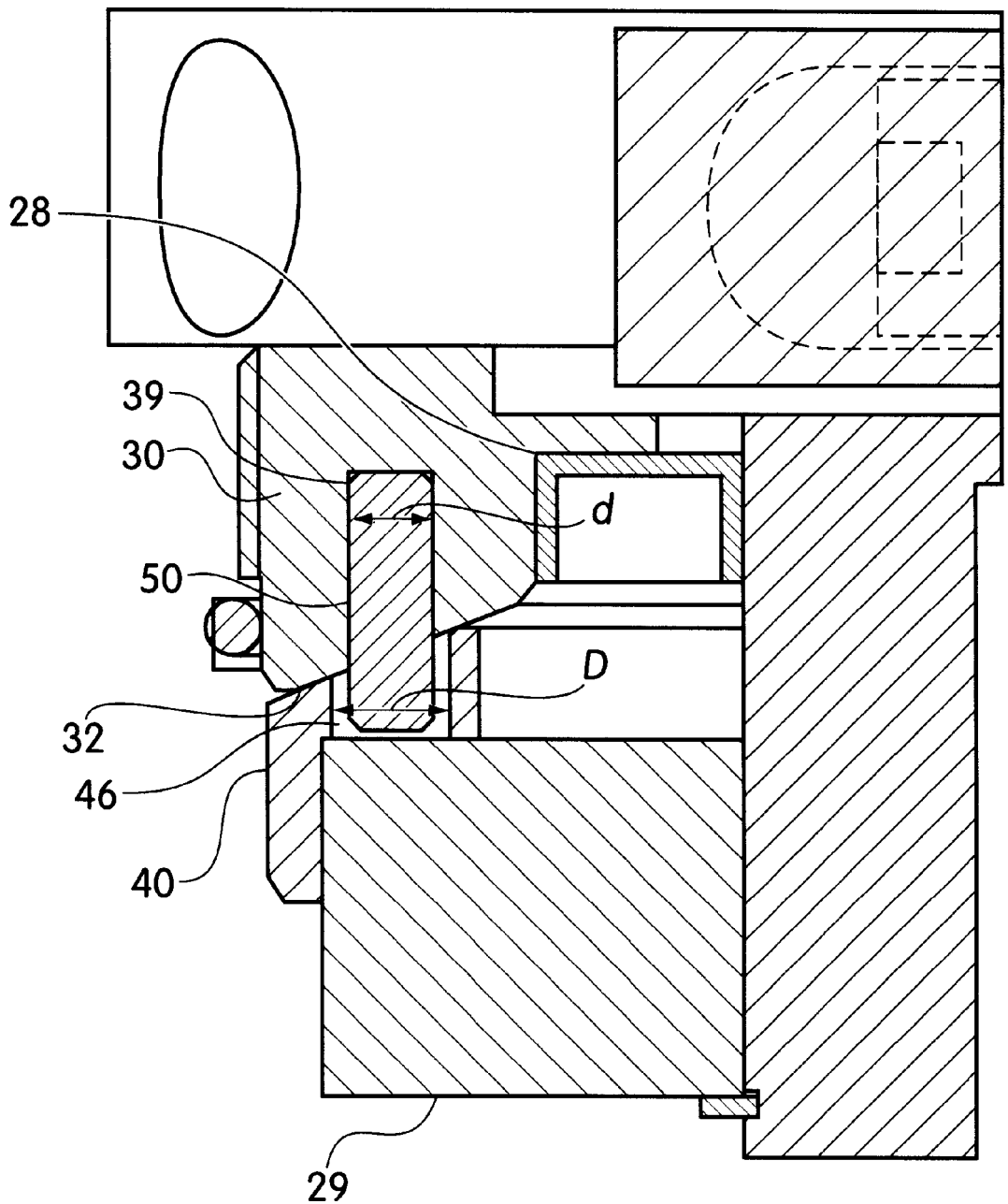
FIG. 2 is an enlarged cross-sectional view of the device according to the invention mounted in a gearbox as shown in FIG. 1.
Figure 3:
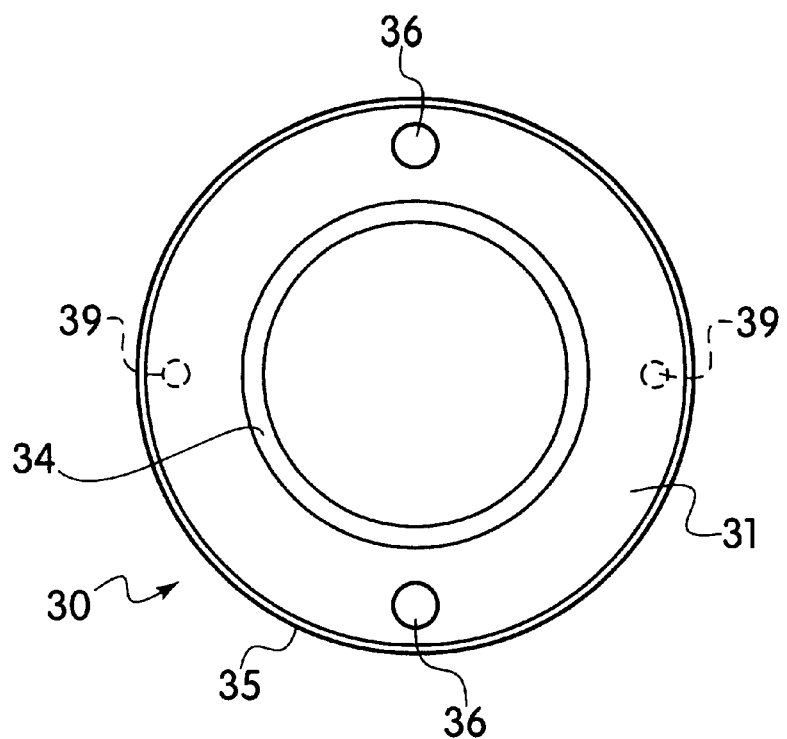
FIG. 3 is a top view of the nut according to the invention.
Figure 5:
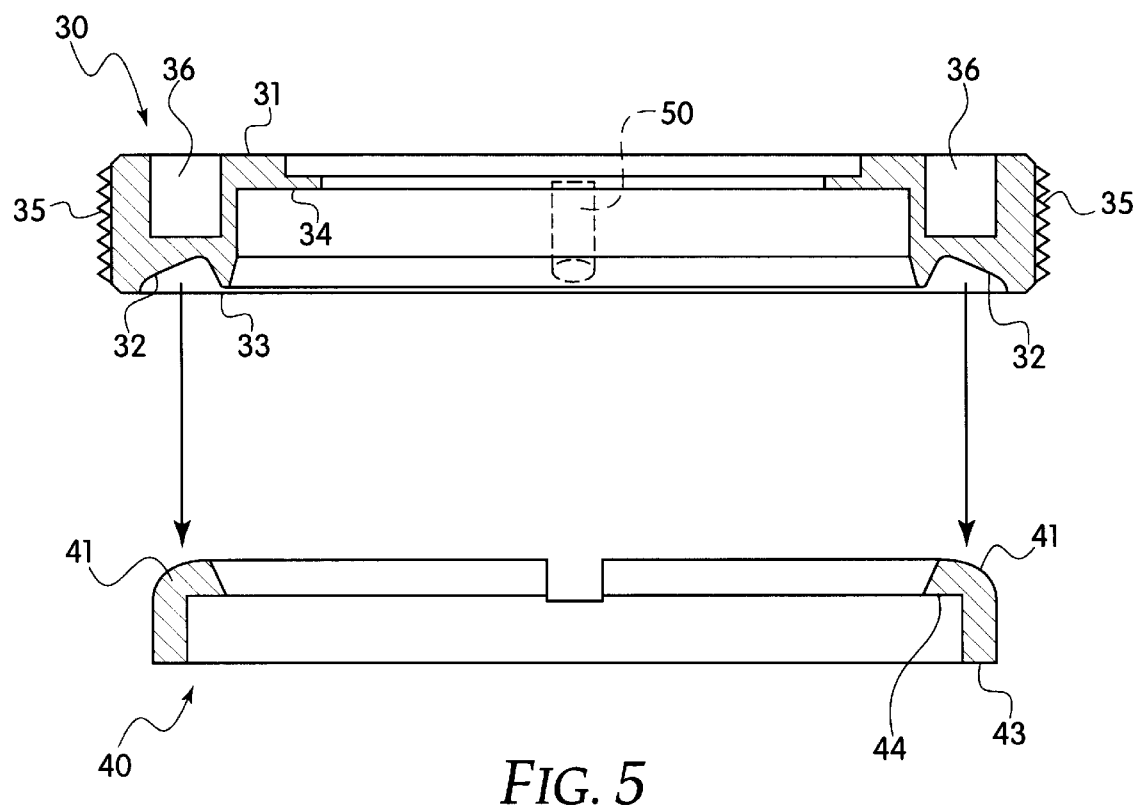
FIG. 5 is an enlarged cross sectional view of the device according to the invention.

Nut 30 has a flat top surface 31, which is shown in FIGS. 2 and 3, and a concave spherical bottom surface 32, shown in detail in FIG. 5. A downwardly-protruding ridge 33 is arranged on bottom surface 32 toward the inner portion of nut 30. Nut 30 has a flat inner portion 34 that extends from the ridge 33 to the inner circumference of nut 30. Ridge 33 and inner portion 34 form a cavity for allowing nut 30 to fit around an oil seal 28 in gearbox assembly 20.

Nut 30 is equipped with external threads 35, shown in FIG. 5. Threads 35 allow nut 30 to be securely screwed into place in gearbox 20, so that no lateral or angular movement of nut 30 is permitted after it is installed in gearbox 20. There are two or more bore holes 36 arranged in the top surface 31 of nut 30, to permit the insertion of pins in nut 30 for further stability in mounting nut 30 to gearbox 20.

Figure 4:
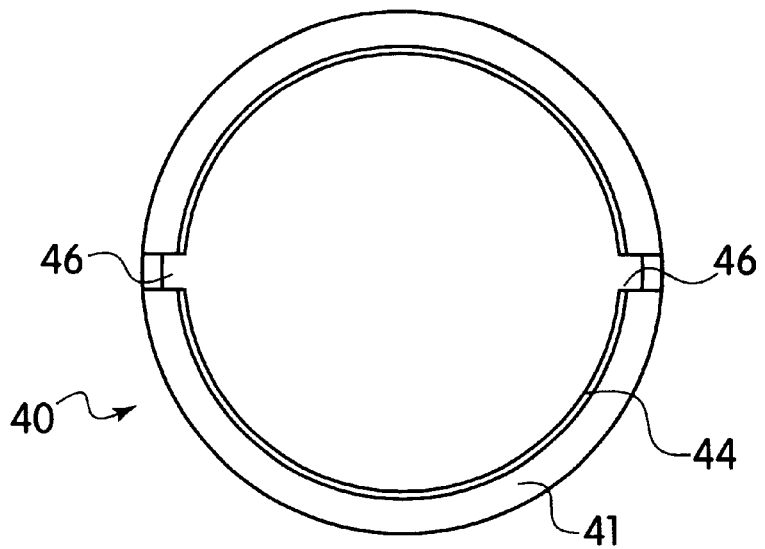
FIG. 4 is a bottom view of the washer according to the invention.

As shown in FIG. 4, washer 40 is a cylindrical metal ring having a convex spherical top surface 41 that corresponds to the concave spherical bottom surface 32 of nut 30, as shown in FIG. 5. Washer 40 has a narrow flat bottom surface 43 and an inner lip 44. Inner lip 44 facilitates the mounting of washer 40 on bearing 14 in gearbox assembly 20, as shown in FIGS. 1 and 2. Washer 40 is preferably fixedly mounted onto bearing 14 in such a way that washer 40 cannot rotate or otherwise move in relation to bearing 14. This is accomplished by the constrictive force of the side walls of washer 40 against bearing 14.

As shown in FIG. 4 and in cross section in FIGS. 1 and 2, there are two slots 46 cut in the top surface on opposing sides of washer 40, and two bores 39 on opposing sides of the bottom surface of washer 30. A pin 50 may be inserted into each of bores 39 and slots 46 when nut 30 is placed on top of washer 40. Pins 50 thus prevent rotation of bearing 14 coupled to washer 40 during operation of motor 10, by securing it to nut 30. The diameter D of slots 46 is slightly larger than the diameter d of pins 50 to permit easy insertion of pins 50 and to allow for sliding of washer 40 against nut 30 as explained below.

Spherical top surface 41 has a slightly smaller width than the width of spherical bottom surface 32, to permit sliding of washer 40 against nut 30 to attain precise alignment of motor shaft 11 within gearbox 20. The curvature of bottom surface 32 and top surface 41 is such that the radius 60 of the sphere defined by the spherical surfaces has an endpoint located in the middle of input shaft 12 at a point 61.

Point 61 defines a rotation point about which washer 40 slides against nut 30 to align motor shaft 11. This sliding keeps input shaft 12 and motor shaft 11 exactly aligned within gearbox 20, and thus reduces the friction and wear on the shaft and connected assemblies.

Accordingly, while only one embodiment of the present invention has been shown and described, it is obvious that many changes and modifications may be made thereunto without departing from the spirit and scope of the invention.

What is claimed is:

1. A gearbox having an input shaft with a rotational axis, a gear mounted on said input shaft and coupled to a driven device, a motor shaft coupled to said input shaft, a bearing supporting said input shaft, and a device for aligning the motor shaft, said device comprising:

a nut mounted on the driven device and having an inner edge, an outer edge and a bottom surface having a concave spherical curvature; and a washer mounted on the bearing and having an upper surface with a convex spherical curvature corresponding to the concave spherical curvature of said nut, said convex spherical curvature of said washer having sufficient clearance to slide against the concave spherical curvature of said nut;

wherein said spherical curvatures mate when said nut is placed on said washer to align the motor shaft within the driven device and maintain alignment even under angular and lateral stresses, and wherein the spherical curvatures of the nut and washer have radii that meet at a point located along the rotational axis of said input shaft, said point defining a rotation point about which said washer slides against said nut to align the motor shaft.

2. The gearbox according to claim 1, wherein the nut has external threads for coupling said nut to said gearbox.

3. The gearbox according to claim 1, further comprising at least one aperture in the bottom surface of said nut and at least one slot in the top surface of said washer, such that a pin positioned in said at least one aperture fits through the slot and prevents rotation of said washer.

4. The gearbox according to claim 1, wherein the washer has a cylindrical side wall and a bottom surface having a width smaller than the width of said upper surface, such that said upper surface defines a lip for mounting said washer on said bearing.

5. The gearbox according to claim 1, wherein the nut has a flat top surface and wherein the bottom surface further comprises a downwardly-extending annular ridge in a central section of said bottom surface and a flat inner portion extending from said annular ridge to the inner edge of said nut, wherein the concave spherical curvature extends from the outer edge of the nut to the annular ridge.

6. The gearbox according to claim 5, wherein said annular ridge and said flat inner portion of said nut define a cavity for receiving a seal surrounding the input shaft.

* * * * *